US009878611B1

(12) United States Patent
Abd Elhamid et al.

(10) Patent No.: US 9,878,611 B1
(45) Date of Patent: Jan. 30, 2018

(54) VEHICLE WITH NATURAL GAS STORAGE ARRAY

(71) Applicant: GM GLOBAL TECHNOLOGY OPERATIONS LLC, Detroit, MI (US)

(72) Inventors: Mahmoud H. Abd Elhamid, Troy, MI (US); Anne M. Dailly, West Bloomfield, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/223,922

(22) Filed: Jul. 29, 2016

(51) Int. Cl.
*B60K 15/03* (2006.01)
*F02B 43/10* (2006.01)

(52) U.S. Cl.
CPC ........ *B60K 15/03006* (2013.01); *F02B 43/10* (2013.01); *B60K 2015/03019* (2013.01); *F02B 2043/103* (2013.01)

(58) Field of Classification Search
CPC .............. B60K 15/03006; B60K 15/07; B60K 15/063; B60K 15/067; B62D 21/16
See application file for complete search history.

(56) References Cited

U.S. PATENT DOCUMENTS

| | | | |
|---|---|---|---|
| 5,370,418 A | 12/1994 | Pugh | |
| 5,788,745 A * | 8/1998 | Hahn | B01D 3/00 203/14 |
| 6,257,360 B1 * | 7/2001 | Wozniak | B60K 15/013 180/69.5 |
| 6,293,590 B1 * | 9/2001 | Ogasa | B60K 15/03006 220/562 |
| 6,481,751 B1 | 11/2002 | Davis, Jr. et al. | |
| 6,923,282 B2 | 8/2005 | Chernoff et al. | |
| 6,974,156 B2 * | 12/2005 | Kosuge | B60K 15/03006 280/831 |
| 6,986,401 B2 * | 1/2006 | Chernoff | B60G 3/18 180/311 |
| 7,270,209 B2 | 9/2007 | Suess | |
| 7,303,211 B2 | 12/2007 | Barroni-Bird et al. | |
| 8,056,928 B2 | 11/2011 | Ijaz et al. | |

(Continued)

FOREIGN PATENT DOCUMENTS

WO WO-2016130156 A1 8/2016

OTHER PUBLICATIONS

Ford Owner Guide Supplement, Ford Motor Company, 2002, 16 pages.
U.S. Appl. No. 61/806,170, filed Mar. 28, 2013, Dailly et al.
U.S. Appl. No. 62/806,062, filed Mar. 28, 2013, Morales et al.

*Primary Examiner* — Brian L Swenson
(74) *Attorney, Agent, or Firm* — Harness, Dickey & Pierce, P.L.C.

(57) ABSTRACT

A vehicle includes a vehicle platform and a natural gas fueled engine attached to the vehicle platform. The engine provides tractive power to at least one drive wheel. The vehicle includes an enclosure, attachable to the vehicle platform, to contain an array of natural gas storage vessels. The array of natural gas storage vessels is disposed completely within the enclosure. Each storage vessel of the array of natural gas storage vessels is in fluid communication with a single outlet port for selectively extracting the natural gas from the array of natural gas storage vessels. Each storage vessel of the array of natural gas storage vessels is in fluid communication with a single natural gas fill port.

20 Claims, 8 Drawing Sheets

(56) References Cited

U.S. PATENT DOCUMENTS

| | | |
|---|---|---|
| 8,517,128 B2 | 8/2013 | Gleyzes et al. |
| 8,779,622 B2 * | 7/2014 | Timmons ............ H01M 2/1083 220/564 |
| 9,114,930 B2 | 8/2015 | Simmons |
| 9,249,931 B2 | 2/2016 | Morales et al. |
| 9,249,933 B2 | 2/2016 | Morales et al. |
| 9,624,851 B2 | 4/2017 | Dailly et al. |
| 2005/0161934 A1 | 7/2005 | Rife et al. |
| 2013/0020139 A1 | 1/2013 | Kim et al. |
| 2014/0290283 A1 | 10/2014 | Ortmann et al. |
| 2014/0290611 A1 | 10/2014 | Abd Elhamid et al. |
| 2014/0290751 A1 | 10/2014 | Dailly et al. |
| 2014/0291048 A1 | 10/2014 | Morales et al. |
| 2015/0053675 A1 * | 2/2015 | Morales ................ F17C 11/007 220/4.12 |
| 2015/0362125 A1 | 12/2015 | Morales et al. |
| 2016/0097348 A1 | 4/2016 | Abd Elhamid et al. |
| 2017/0067415 A1 | 3/2017 | Cai et al. |

\* cited by examiner

VEHICLE WITH NATURAL GAS STORAGE ARRAY

BACKGROUND

Natural gas vehicles are vehicles that use natural gas as a fuel that ultimately powers the vehicle to cause the vehicle to move. As used herein, a vehicle is a movable device for transporting people or materials on land, in air, in water, or through space. Examples of vehicles include automobiles, trucks, motorcycles, carts, wagons, trains, aircraft, missiles, ships, boats, submarines, and spaceships.

The natural gas may fuel an internal combustion engine that drives a powertrain and causes a drive wheel or propeller to turn. The natural gas may also be used to power an on-board generator that provides electrical power to an electric motor that causes a drive wheel or propeller to turn. Natural gas may be used to power a fuel cell that provides electrical power to an electric propulsion motor.

Natural gas may be stored in cylindrical pressure vessels, or vessels having any suitable shape. For example, a natural gas storage vessel may be spherical, cubic, or any other shape, regular or irregular, that can enclose a volume. When natural gas is stored at high pressure, cylindrical and spherical storage vessels tend to be chosen because of the stress-handling characteristics of cylinders and spheres. However, packaging large cylinders and spheres in an automobile has heretofore resulted in reductions in space available for occupants or for cargo.

Some aspects of certain cylindrical pressure vessels are referenced by a "Type number" as defined by ISO (International Organization for Standardization). According to ISO 11439-Second Edition, a gas cylinder of Type 1 design is an all metal cylinder. A Type 2 design is a hoop wrapped cylinder with a load sharing metal liner and composite reinforcement on the cylindrical part only. A Type 3 design is a fully wrapped cylinder with a load sharing metal liner and composite reinforcement on both the cylindrical part and dome ends. A Type 4 design is a fully wrapped cylinder with a non-load sharing liner and composite reinforcement on both the cylindrical part and dome ends.

SUMMARY

A vehicle includes a vehicle platform and a natural gas fueled engine attached to the vehicle platform. The engine provides tractive power to at least one drive wheel. The vehicle includes an enclosure, attachable to the vehicle platform, to contain an array of natural gas storage vessels. The array of natural gas storage vessels is disposed completely within the enclosure. Each storage vessel of the array of natural gas storage vessels is in fluid communication with a single outlet port for selectively extracting the natural gas from the array of natural gas storage vessels. Each storage vessel of the array of natural gas storage vessels is in fluid communication with a single natural gas fill port.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
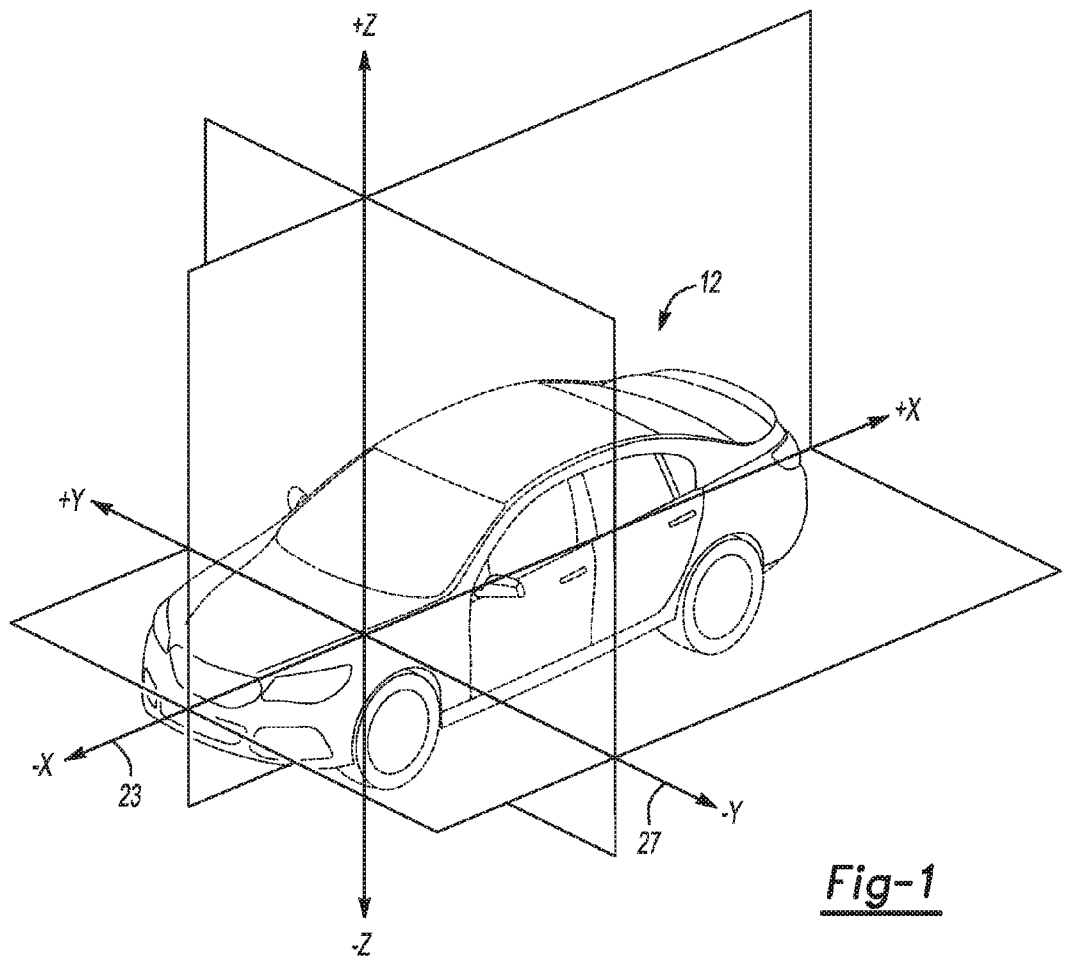
FIG. 1 is a coordinate system diagram depicting an example of vehicle space.

Natural gas vehicles are fitted with on-board storage tanks. Some natural gas storage tanks are designated low pressure systems, and these systems are rated for pressures up to about 750 pounds per square inch (psi). In an example, the low pressure systems are rated for pressures of about 725 psi and lower. During refueling, the container of the low pressure system storage tank is designed to fill until the tank achieves a pressure within the rated range. Other natural gas storage tanks are designated high pressure systems, and these systems are rated for pressures ranging from about 3,000 psi to about 3,600 psi. Similar to low pressure system storage tanks, the container of the high pressure system storage tank is designed to fill until the tank achieves a pressure within the rated range. Since the tanks of the present disclosure are used for storage of natural gas, the term "tank" may be interchanged with "storage vessel" in the present disclosure.

As used herein, refueling means the introduction of a quantity of natural gas into a container to increase the quantity of the natural gas in the container. Refueling of natural gas containers is typically accomplished by connecting the natural gas container to a high pressure source. The fuel flows from the high pressure source into the natural gas container. When the pressure difference between the source and the natural gas container is high, the flow rate is generally higher than when the pressure difference is small. At very high pressure differences, flow rate may be limited by the speed of sound. This may be called choked flow, or critical flow. As the natural gas container fills, the pressure difference is reduced. When the pressure difference becomes low, the flow rate slows. When the pressure of the natural gas inside the container equals the pressure of the source, the flow stops. However, it is typical for refueling to be terminated before the tank actually reaches the source pressure. Typically, refueling is terminated when the tank reaches a target pressure that is somewhat lower than the source pressure. In some cases, refueling may be terminated when the flow rate falls to a target flow rate. In some cases, the flow rate may be measured by a flow meter, in other cases, the flow rate may be estimated from a rushing sound caused by the flow.

Unlike liquid fuel, natural gas can expand and contract significantly depending on the gas pressure and the temperature. In an example, some CNG (Compressed Natural Gas) containers may be rated at 3,600 psi. As used herein, the service capacity of the CNG container rated at 3,600 psi is the mass of the natural gas stored in the container at 3,600 psi and 15° C. (degrees Celsius).

The United States National Institute of Standards and Technology (NIST) has defined a GGE (Gasoline Gallon Equivalent) as 5.660 pounds of natural gas. The NIST was using a U.S. Gallon which is equivalent to 3.78541 Liters. NIST also defined a GLE (Gasoline Liter Equivalent) as 0.678 kilograms of natural gas.

One way to increase the energy density of natural gas stored on-board a vehicle is to store the natural gas at a high pressure. At 3600 psi (250 bar) natural gas has an energy density of about 11.1 $MJ \cdot L^{-1}$ (Mega Joules per Liter). Typical gasoline has an energy density of about 32 $MJ \cdot L^{-1}$. Therefore, in order to provide the same amount of energy, CNG tanks should have approximately three times the volume compared to a gasoline fuel tank to provide a similar driving range on an otherwise similar vehicle. Some currently available natural gas vehicles use on-board fuel tanks that occupy a portion of the trunk space of the vehicle. The trunk space shields the CNG tanks from elements of the environment that may affect durability of the CNG tanks. For example, the sheet metal surrounding the trunk space may shield the CNG tanks from water, road salt, abrasive debris, stones, and ultraviolet light. However, the space in the trunk of a vehicle that is reserved for the CNG tanks may be desirable for cargo storage to some vehicle purchasers and users. It may be desirable to package natural gas storage vessels to use space efficiently so as to maximize usable cargo or occupant space in the vehicle.

As disclosed herein, conformable natural gas storage vessels are located in an enclosure that is embedded into a vehicle platform. The location of the enclosure of the present disclosure in existing space in the vehicle platform frees cargo space in the vehicle. The natural gas storage vessels are hidden where the typical user of the automobile will not see the natural gas storage vessels. The space for cargo is not reduced compared to a gasoline or gasoline/electric hybrid vehicle. The natural gas storage vessels are located in an enclosure that may shield the natural gas storage vessels from ultraviolet light and/or moisture.

FIG. 1 is a coordinate system diagram depicting an example of vehicle space. As used herein, "left" means in the negative "Y" direction as depicted in FIG. 1. FIG. 1 depicts a similar coordinate system to the coordinate system depicted in SAE J182, "Motor Vehicle Fiducial Marks and Three-dimensional Reference System", reaffirmed April 2005, FIG. 1. Using the same coordinate system, "right" means in the positive "Y" direction as depicted in FIG. 1. "Forward" means in the negative X direction as depicted in FIG. 1; "aft" or "rearward" means in the positive "X" direction as depicted in FIG. 1; "up" means in the positive "Z" direction as depicted in FIG. 1; and "down" means in the negative "Z" direction as depicted in FIG. 1.

Figure 2A:
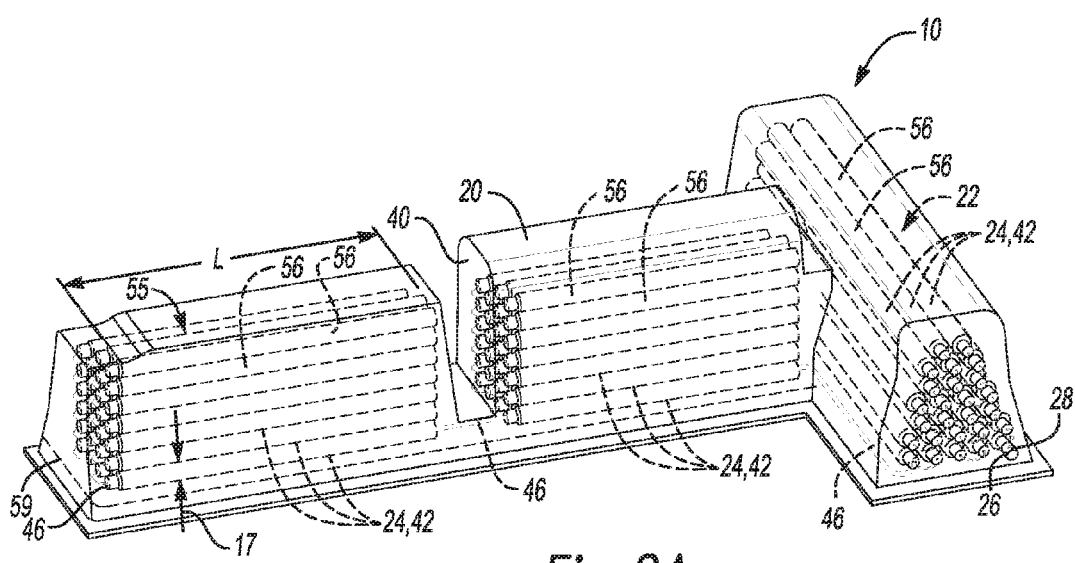
FIG. 2A is a semi-schematic perspective view of an example of a natural gas storage container according to the present disclosure.
Figure 2B:
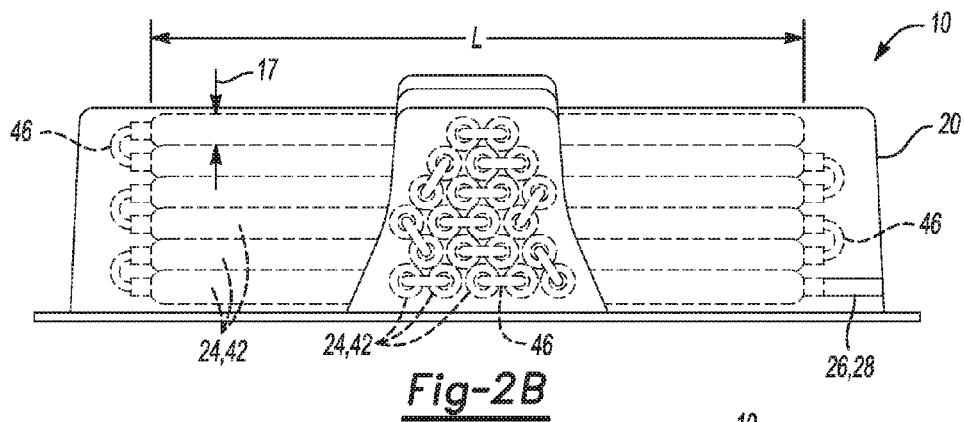
FIG. 2B is a semi-schematic front view of the example of the natural gas storage container depicted in FIG. 2A with portions of the housing cut away to reveal examples of the natural gas storage vessels.
Figure 2C:
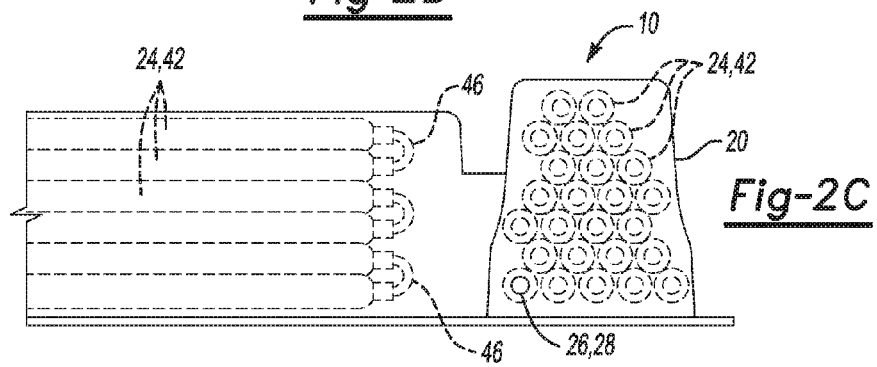
FIG. 2C is a semi-schematic, partial left side view of the example of the natural gas storage container depicted in FIG. 2A with portions of the housing cut away to reveal examples of the natural gas storage vessels.

FIG. 2A, FIG. 2B, and FIG. 2C together depict an example of a natural gas storage container 10 according to the present disclosure. As depicted in FIGS. 2A-2C, each natural gas storage vessel 24 in the array 22 of natural gas storage vessels 24 may be a cylindrical vessel 42 having an aspect ratio greater than 10. As used herein, "aspect ratio" of a cylindrical vessel 42 means a ratio of the length L of the cylindrical vessel 42 to the diameter 17 of the cylindrical vessel 42. The natural gas storage container 10 includes an enclosure 20 to contain the array 22 of natural gas storage vessels 24. The array 22 of natural gas storage vessels 24 is disposed completely within the enclosure 20. Each natural gas storage vessel 24 of the array 22 of natural gas storage vessels 24 is in fluid communication (directly, or indirectly through one or more adjacent natural gas storage vessels 24) with a single outlet port 26 for selectively extracting the natural gas from the array 22 of natural gas storage vessels 24. Connecting tubes 46 may join the natural gas storage vessels 24 and place the natural gas storage vessels 24 in fluid communication. The natural gas storage vessels 24 may be in serial fluid communication, parallel fluid communication, or combinations of serial and parallel fluid communication. Each natural gas storage vessel 24 of the array 22 of natural gas storage vessels 24 is in fluid communication (directly, or indirectly through one or more adjacent storage vessels 24) with a single natural gas fill port 28. In an example, the single outlet port 26 is the single natural gas fill port 28. In other words, the functions of the single outlet port 26 and the single natural gas fill port 28 may be combined in a single fill/outlet port. The enclosure 20 is removably attachable to a vehicle platform 14 (e.g. FIG. 5). The natural gas storage container 10 may have valves, tubes and electronic modules entirely within the enclosure 20 to form an integrated package that is easy to install, service, or replace. In examples of the present disclosure, the enclosure 20 may include a fluid cooling circuit 59.

Figure 3:
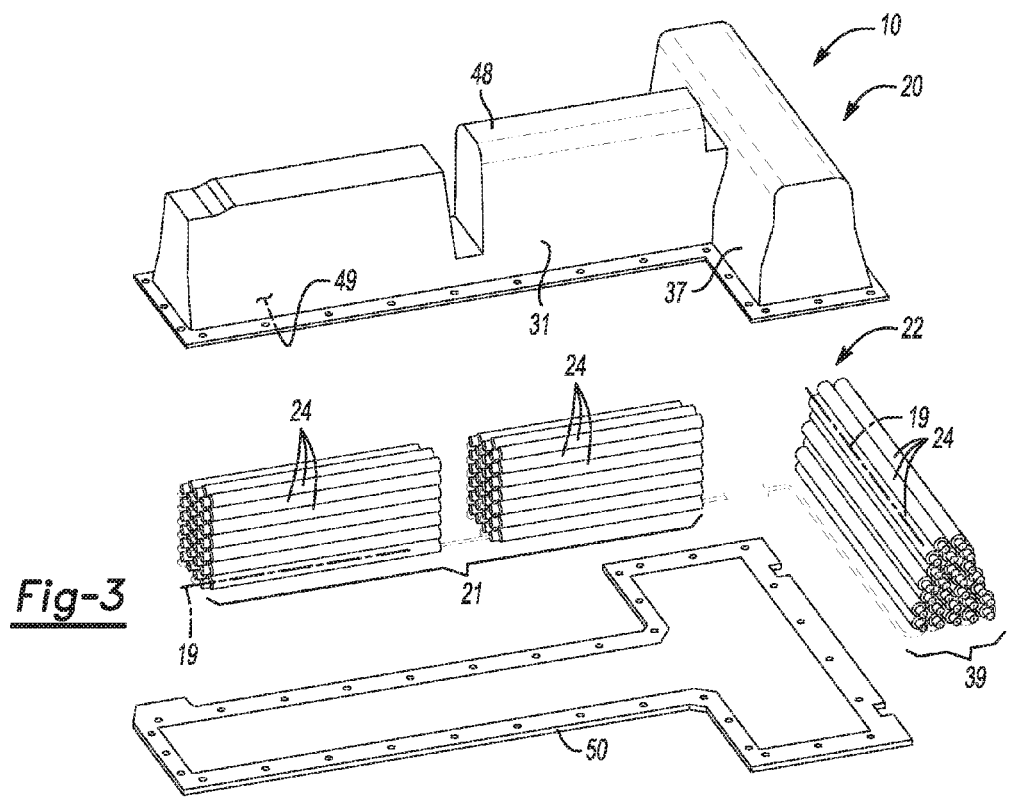
FIG. 3 is a semi-schematic exploded perspective view of an example of a natural gas storage container according to the present disclosure.

FIG. 3 is a semi-schematic exploded perspective view of an example of the natural gas storage container 10 depicted in FIGS. 2A-2C according to the present disclosure. In the example depicted in FIG. 3, the enclosure 20 has an enclosure body 48 and an enclosure floor 50. The enclosure body 48 defines a T-shaped enclosure body cavity 49. The enclosure 20 may have an enclosure floor 50, removably and sealingly attachable to the enclosure body 48. The enclosure body 48 and the enclosure floor 50 together define a fore-aft compartment 31 having a fore-aft subset 21 of the array 22 of natural gas storage vessels 24 disposed in the fore-aft compartment 31. The enclosure body 48 and the enclosure floor 50 together define a transverse compartment 37 having a transverse subset 39 of the array 22 of natural gas storage vessels 24 disposed in the transverse compartment 37 of enclosure 20. The fore-aft compartment 31 intersects the transverse compartment 37. As such, the fore-aft compartment 31 and the transverse compartment 37 are open at their intersection, thereby forming the T-shaped enclosure body cavity 49.

Figure 4:
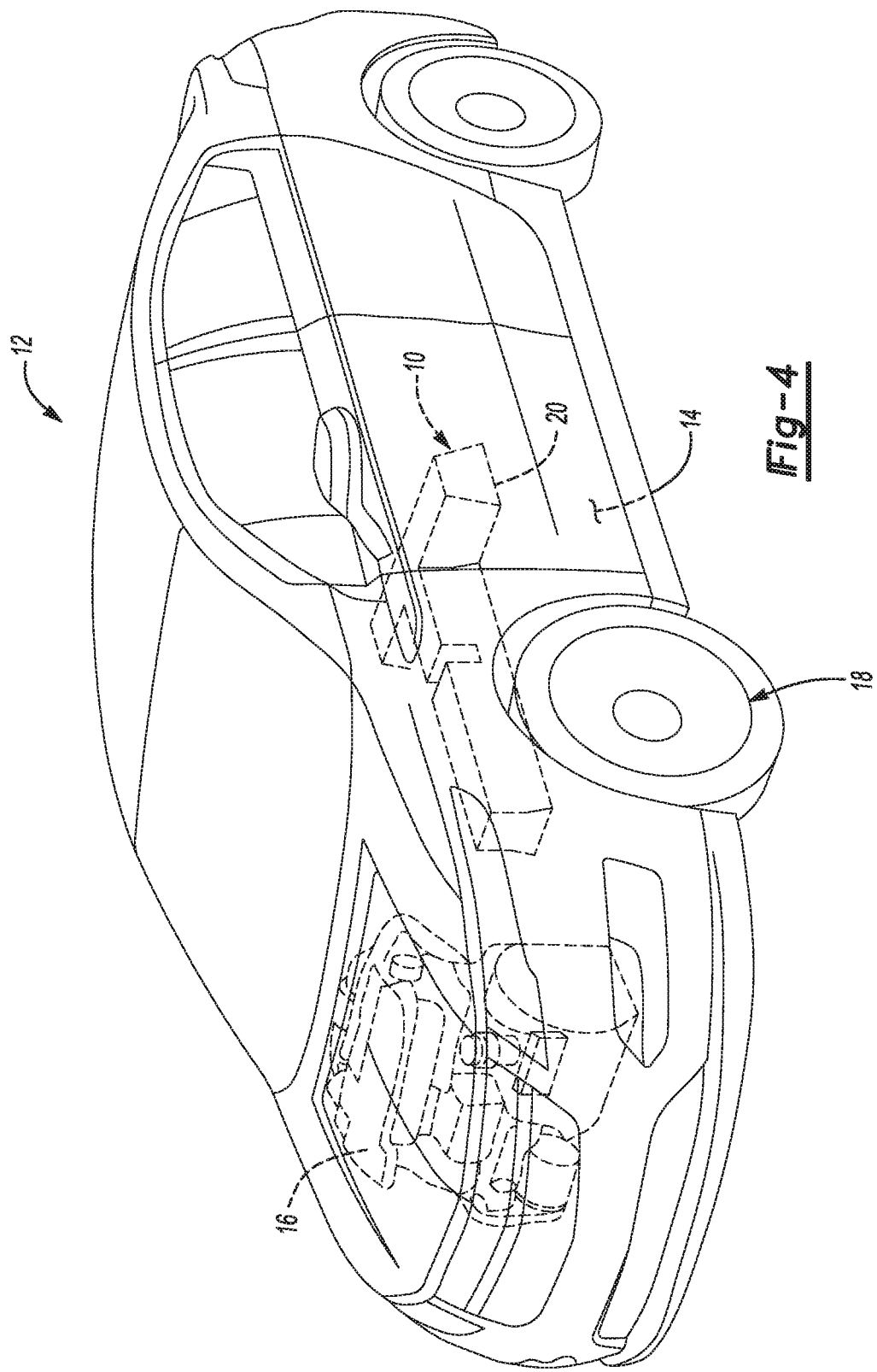
FIG. 4 is a semi-schematic, perspective view of an example of a vehicle with a natural gas storage container located therein according to the present disclosure.

FIG. 4 is a semi-schematic, perspective view of an example of a vehicle 12 with a natural gas storage container 10 located therein according to the present disclosure. Examples of the vehicle 12 include a vehicle platform 14. The vehicle 12 includes a natural gas fueled engine 16 attached to the vehicle platform 14. The natural gas fueled engine 16 is to provide tractive power to at least one drive wheel 18. Examples of the vehicle 12 of the present disclosure include an enclosure 20.

The enclosure 20 is attachable to the vehicle platform 14 to contain an array 22 of natural gas storage vessels 24 (e.g., FIG. 2A). The array 22 of natural gas storage vessels 24 is disposed completely within the enclosure 20. Each natural gas storage vessel 24 of the array 22 of natural gas storage vessels 24 is in fluid communication (directly, or indirectly through one or more adjacent natural gas storage vessels 24) with a single outlet port 26 for selectively extracting the natural gas from the array 22 of natural gas storage vessels 24. Each natural gas storage vessel 24 of the array 22 of natural gas storage vessels 24 is in fluid communication (directly, or indirectly through one or more adjacent natural gas storage vessels 24) with a single natural gas fill port 28. In an example, the single outlet port 26 is the single natural gas fill port 28. In other words, the functions of the single outlet port 26 and the single natural gas fill port 28 may be combined in a single fill/outlet port.

As used herein, the term "vehicle platform" means the basic structure on which a vehicle is built, which defines the general size, strength, and body construction of the vehicle. The specific meaning of "vehicle platform" herein depends on the type of body construction for a particular vehicle model. Two main platform styles are body-on-frame and unibody (also known as unitized or unitary). In vehicles having a body-on-frame style platform, a ladder-style frame provides the vehicle's strength and attachment points for the mechanical components and body. Some heavy-duty vehicles such as pickup trucks and most off-road-capable SUVs have body-on-frame style platforms. In vehicles with unibody construction, an integral floor pan (the metal that forms the vehicle's underside) performs the same function as the separate frame in vehicles having body-on-frame style platforms. Some passenger cars, as well as certain "car-based" SUVs have unibody construction. Therefore, the vehicle platform for a unibody construction vehicle refers to the floor pan; and for a body-on-frame style vehicle, the vehicle platform refers to the frame.

As used herein, the term "chassis" means the main supporting structure of a motor vehicle to which all other components of the vehicle are attached. As used herein when referring to vehicles with body on frame construction, the chassis means the frame. Historically, most vehicles had a separable body and frame. If the running gear such as wheels and transmission, and sometimes the driver's seat, are assembled onto the chassis, then the assembly is described as a rolling chassis. In vehicles with unitized construction, the functions of the frame and the body are integrated. Therefore, as used herein, the term "chassis" when applied to a vehicle with unitized construction, means the floor pan of the vehicle.

Referring to FIG. 1, FIG. 2A, FIG. 3 and FIG. 4 together, each natural gas storage vessel 24 in the array 22 of natural gas storage vessels 24 may be a cylindrical vessel 42 having an aspect ratio greater than 10. Each natural gas storage vessel 24 in the array 22 of natural gas storage vessels 24 may have a cylindrical axis 19. The cylindrical axes 19 of the natural gas storage vessels 24 in a fore-aft subset 21 of the array 22 of natural gas storage vessels 24 are parallel to a fore-aft axis 23 of the vehicle 12. The fore-aft axis 23 of the vehicle 12 is the same as the X-axis shown in FIG. 1. The cylindrical axes 19 of the natural gas storage vessels 24 in a transverse subset 39 of the array 22 of natural gas storage vessels 24 are parallel to a transverse axis 27 of the vehicle 12 and perpendicular to the fore-aft axis 23 of the vehicle 12. The transverse axis 27 of the vehicle 12 is the same as the Y-axis shown in FIG. 1.

In examples of the present disclosure, the array 22 of natural gas storage vessels 24 has a capacity large enough to produce an acceptable driving range. In an example, the capacity of the array 22 of natural gas storage vessels 24 may be at least 4.73 Gasoline Gallon Equivalent (GGE) at 3600 psi. In a vehicle that gets about 41 miles per GGE, 4.73 GGE is enough natural gas to produce a driving range of about 194 miles. At 3600 psi and 15 degrees Celsius, 4.73 GGE of natural gas is compressed to a volume of about 60 liters. The capacity of the array 22 of natural gas storage vessels 24 may be larger or smaller depending on the fuel efficiency of the vehicle 12 and the acceptable driving range.

Figure 5:
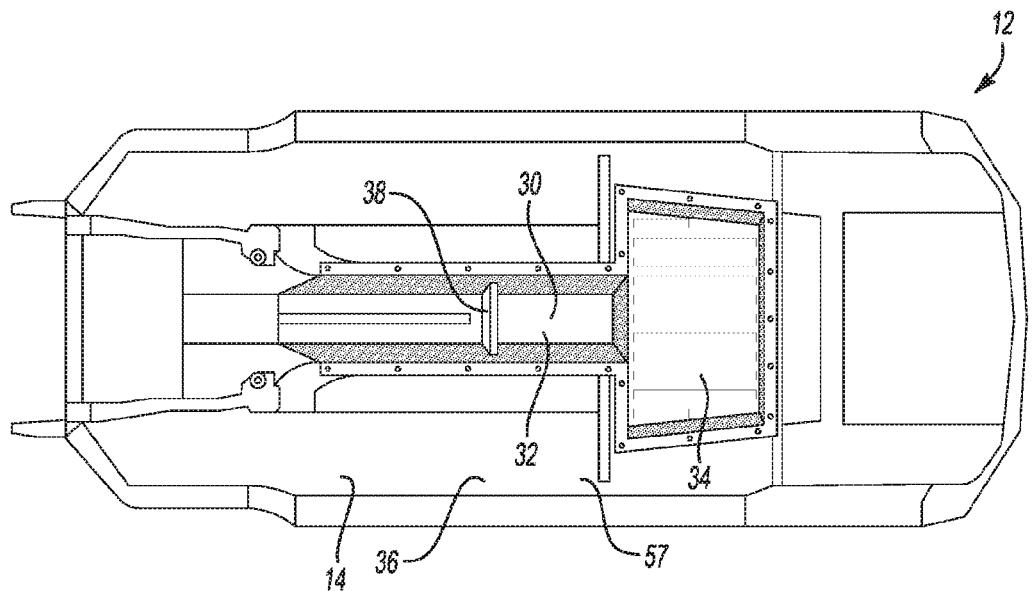
FIG. 5 is a semi-schematic, bottom view of an example of a vehicle platform depicting an example of a T-shaped platform cavity according to the present disclosure.
Figure 6:
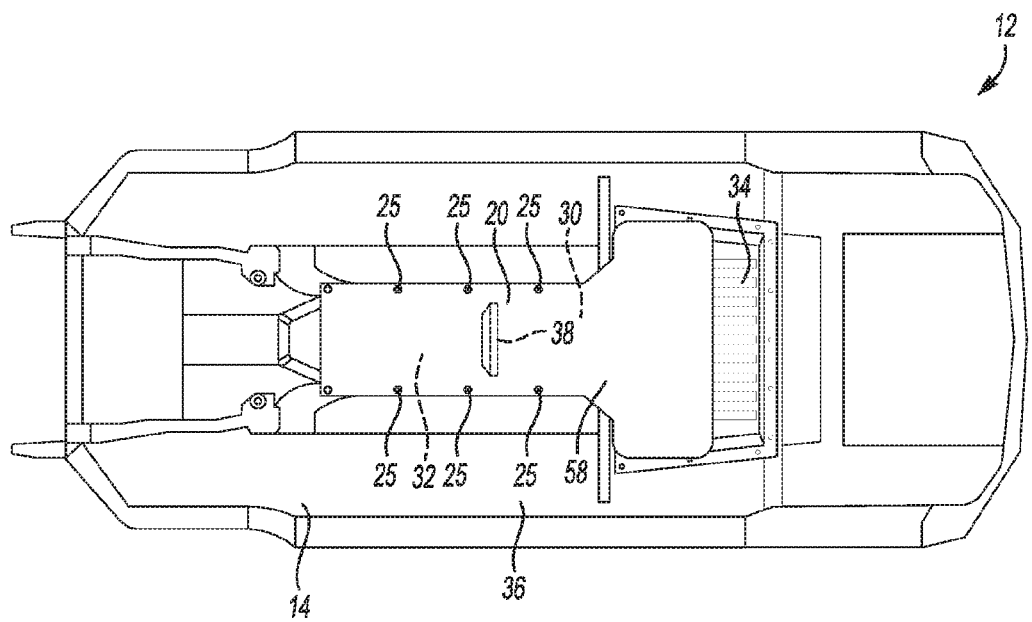
FIG. 6 is a semi-schematic, bottom view of an example of a vehicle with an enclosure of a natural gas storage container nested in the T-shaped platform cavity and attached to the vehicle platform according to the present disclosure.

FIG. 5 is a semi-schematic, bottom view of an example of a vehicle platform 14 depicting an example of a T-shaped platform cavity 30 according to the present disclosure. In the example depicted in FIG. 5, the vehicle platform 14 defines a T-shaped platform cavity 30 having a fore-aft portion 32 and a transverse portion 34 intersecting the fore-aft portion 32. The T-shaped platform cavity 30 is open on a road-facing side 36 of the vehicle platform 14. Referring to the vehicle coordinate space depicted in FIG. 1, the road-facing side 36 is the bottom of the vehicle 12 that faces the negative "Z" direction. As shown in FIG. 6, the enclosure 20 is T-shaped to nest in the T-shaped platform cavity 30. The enclosure 20 may be removable from the T-shaped platform cavity 30 by removing fasteners 25 and lowering the enclosure 20 away from the vehicle platform 14. As depicted in FIG. 5, the vehicle platform 14 may have a cross-member 38 that interrupts the fore-aft portion 32 of the T-shaped platform cavity 30. The enclosure 20 may define a notch 40 (see FIG. 2A) so that the enclosure 20 nests in the T-shaped platform cavity 30 and defines a relatively flat underbody that maintains ground clearance and has smooth aerodynamics that reduces drag and wind noise.

In examples of the present disclosure, the vehicle platform 14 may include stamped sheet metal 57 (FIG. 5) and the enclosure 20 may include a conductive material 58 to equalize an electrical potential between the enclosure 20 and the vehicle platform 14. In an example, the conductive material 58 may be a metallic layer defined on a wall of the enclosure 20. The wall may define any surface of the enclosure 20. The metallic layer may be the only layer of a particular wall, or the metallic layer may be one of several layers that form the wall. The wall may be formed entirely from a layer of metal, for example using sheet metal or a metal casting. A plastic wall may be made conductive with conductive metal or carbon strands or fibers embedded in or disposed on the plastic wall. A metal layer may be deposited on a plastic wall, for example by Physical Vapor Deposition (PVD).

Figure 12:
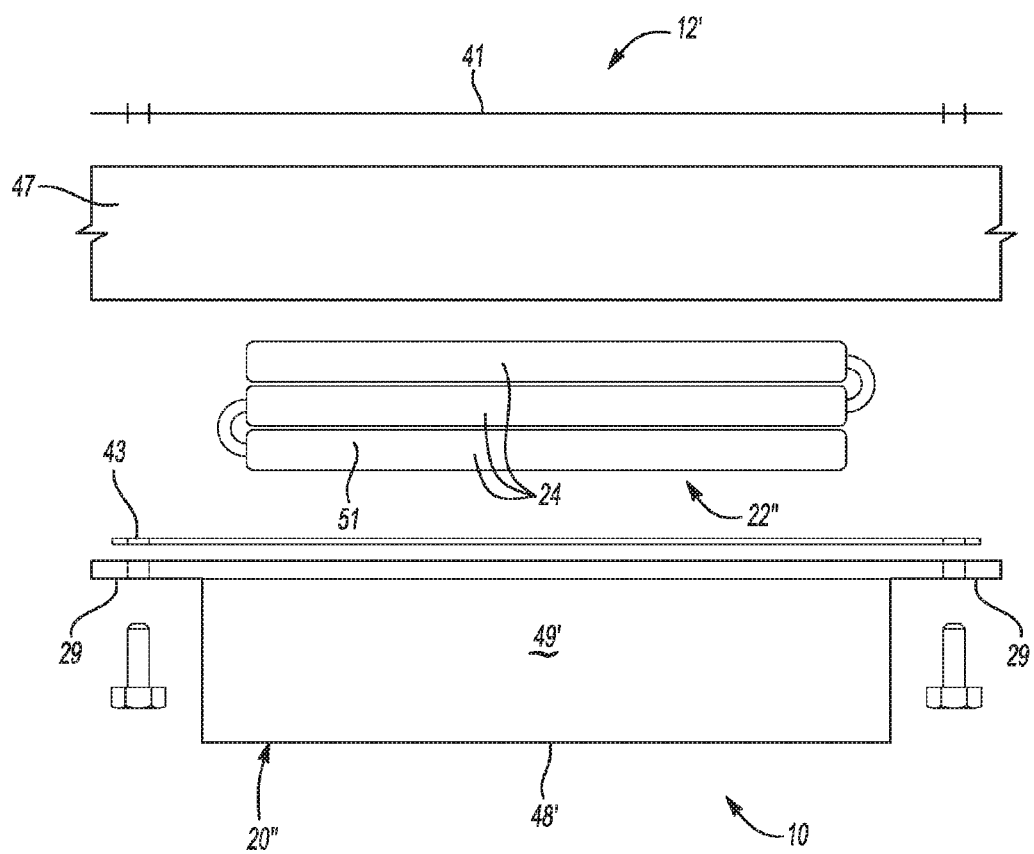
FIG. 12 is a semi-schematic exploded partial side view of an example of a vehicle with a natural gas storage container embedded into a chassis of the vehicle according to the present disclosure.

FIG. 12 depicts an exploded partial side view of an example of a vehicle 12' having a natural gas storage container 10 according to the present disclosure. In the example depicted in FIG. 12, the natural gas storage container 10 includes an enclosure body 48' having an enclosure body cavity 49'. The enclosure body 48' is removably and sealingly attached to the vehicle 12'. In the example depicted in FIG. 12, the enclosure body 48' has a sealing flange 29 that is complementary shaped to seal against the floor pan 41 of the vehicle 12'. The enclosure body 48' along with the floor pan 41 and any related gaskets, seals, and fasteners, are assembled to form the enclosure 20''. The enclosure body 48' may be embedded into a chassis 47 of the vehicle 12'. A gasket 43 may be included to enhance the sealing of the enclosure body 48' against the floor pan 41. The gasket 43 may be formed from a resilient material such as silicone, and may be a discrete piece, or may be formed in place. The natural gas storage container 10 includes an array 22'' of natural gas storage vessels 24 disposed within the enclosure body cavity 49'. The array 22'' of natural gas storage vessels 24 has at least one Type 4 gas cylinder 51. The enclosure body 48' occludes a substantial amount of ultraviolet light and moisture from coming into contact with the array 22'' of natural gas storage vessels 24. As used herein, occluding a substantial amount of ultraviolet light means that ultraviolet light generated by the sun and directed toward the enclosure 20, 20', 20'' directly or by reflection will not reach the array 22, 22', 22'' of natural gas storage vessels 24, 24' in a detectable amount. As used herein, occluding a substantial amount of moisture means that water splashed from a road surface by motion of the vehicle along the road, or sprayed from a car wash, will not reach the array 22, 22', 22'' of natural gas storage vessels 24, 24' in liquid form in a detectable amount.

The array 22, 22', 22'' of natural gas storage vessels 24, 24', the connecting tubes 46, fluid connectors and valves that are in fluid communication with the array 22, 22', 22'' of natural gas storage vessels 24, 24' and completely within the enclosure 20, 20', 20'' may be shielded by the enclosure 20, 20', 20'' from moisture in the form of humid air. Therefore, water will not condense on the natural gas storage vessels 24, 24', the connecting tubes 46, fluid connectors and valves that are in fluid communication with the array 22, 22', 22'' of natural gas storage vessels 24, 24' and completely within the enclosure 20, 20', 20''. The lack of condensation, even if the components become very cold from Joule-Thompson cooling, may prevent the formation of ice on surfaces that would be exposed to humid air if the components were not shielded by the enclosure 20, 20', 20''.

The enclosure body 48, 48' may occlude ultraviolet light and prevent the ultraviolet light from illuminating the natural gas storage vessels 24, 24' by being made from a material that is opaque to ultraviolet light. Examples of materials that are opaque to ultraviolet light include steel, aluminum, and opaque plastic. The enclosure body 48, 48' may be embedded into a chassis 47 of the vehicle 12'. Therefore, the enclosure body 48' is located below the floor pan 41 of the vehicle 12', and does not reduce the cargo volume of the trunk or cargo bed. It is to be understood that even though the enclosure body 48' is located below the floor pan 41, ultraviolet light may be reflected toward the enclosure body 48' by a road surface, snow or a puddle (not shown). To block reflected ultraviolet light, the enclosure body 48' and the floor pan 41 may be made from a material that is opaque to ultraviolet light. In the example depicted in FIG. 12, the enclosure body 48' is sealed against the floor pan 41, thereby preventing water from entering the enclosure body cavity 49'. The natural gas storage container 10 may have a liquid discriminating breather (not shown) to reduce stress and strain from atmospheric and thermally induced pressure variation on the enclosure body 48'. The natural gas storage container 10 may also prevent road salt, abrasive debris and stones from affecting the durability of the array 22'' of natural gas storage vessels 24.

Natural gas storage vessels, according to examples of the present disclosure, may be conformable tanks. As used herein, "conformable" means the tank efficiently uses available space defined by a surface. The available space may be an irregular space, having pockets extending from a main space. For example, a body panel inner surface, or a floor surface of a vehicle that defines the space available for a tank may be curved for aesthetic appeal, structural stiffness, or other reasons. Struts, bosses, ridges, and other structural shapes may be formed into the body or floor panel. In some cases, a single classic cylindrical pressurized gas tank may not efficiently use space adjacent to such shapes. An example of a conformable tank of the present disclosure may fit within the shape of the body panel or floor that defines the available space with a minimum of unused space. As such, examples of the conformable tanks of the present disclosure use space more efficiently than a classic cylindrical pressurized gas tank. A single cylindrical tank is not considered a conformable tank in the present disclosure, even if the space available is cylindrical, for example, in a rocket. As used herein, conformable does not mean that the tank cylinder is elastic, resiliently taking the available shape like a rubber balloon inflated in a box.

Conformability of tanks may be compared by determining a conformability factor. As used herein, conformability factor means a ratio of an outer tank volume divided by an enclosing rectangular cuboid volume. For example, the conformability of the cylindrical vessel 42 shown in FIG. 7 may be calculated as follows:

$$V_{tank} = \frac{4}{3}\pi r_{end}^3 + \pi r_{end}^2 L$$

$$V_{cuboid} = (2r_{end})^2 * (2r_{end} L)$$

$$\text{Conformability} = \frac{V_{tank}}{V_{cuboid}} * 100\%$$

In an example, let L=37.25 inch; and $r_{end}$=8.1 inch. Conformability=67%

Figure 7:
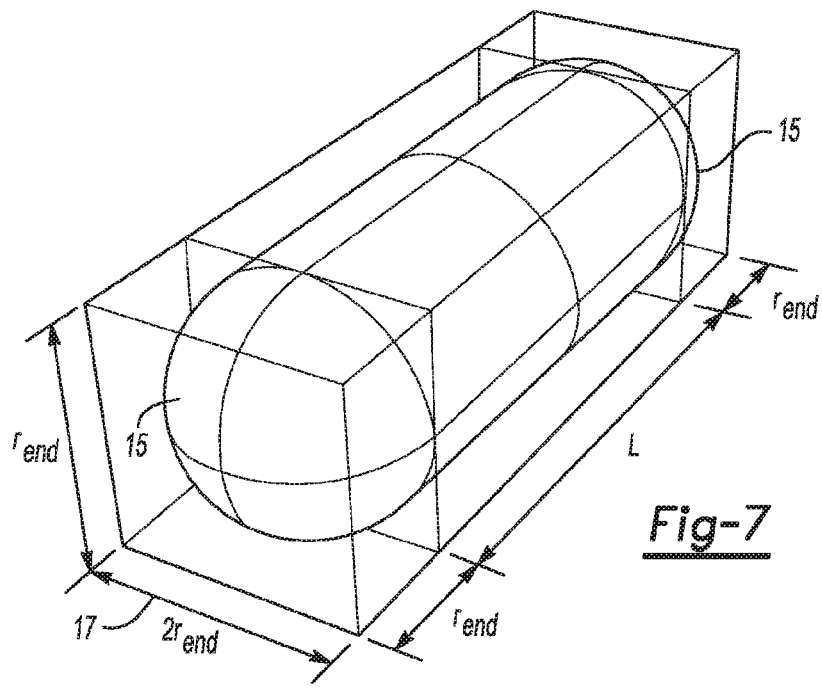
FIG. 7 is a perspective view of a cylindrical tank with hemispherical ends and an enclosing rectangular cuboid with dimensions shown for use in an example calculation of a conformability factor.

If the tank depicted in FIG. 7 has 0.5 inch (1.27 cm) thick steel walls and the dimensions $r_{end}$ and L given above, the tank would weigh about 257 lbs (117 kg) and have an internal volume of about 93 liters. In certain tank shapes, for example a sphere (conformability factor=52%) or a right circular cylinder (conformability factor=78%), the conformability factor is independent of the actual dimensions of the tank. The conformability factor for a cylindrical tank with hemispherical ends 15 tends to be independent of size when L is much larger than the diameter 17. In FIG. 7, the diameter 17 is the same as $2r_{end}$. Therefore, for high aspect ratio cylindrical pressure vessels, the conformability tends to be independent of size because the ends contribute a smaller percentage of the volume. Some examples of conformable pressure vessels may have aspect ratios greater than about 5. In some examples of the present disclosure, the aspect ratio of conformable cylindrical pressure vessels may be greater than 1440. Non-cylindrical conformable pressure vessels, for example the truncated octahedron natural gas storage vessels depicted in FIG. 10, may have an aspect ratio of about 1.

The space available for a natural gas tank may be, for example, in a vehicle cargo storage area or trunk. As such, space occupied by the natural gas tank is not available for cargo in the vehicle. Therefore, efficient use of space by a natural gas tank may be desirable.

One standard for measuring usable cargo space in a vehicle may be found in SAE J1100, Revised September 2005, Section 7, Cargo Dimensions and Cargo Volume Indices. SAE J1100 calls for luggage capacity to be determined by fitting a number of standard luggage pieces into the luggage space. As such, some "unusable" space will remain between the standard luggage pieces and the curved surfaces of the inner body panels that define the luggage space. Other space may be determined to be unusable for luggage if one of the standard luggage pieces will not fit in the space. Examples of the present disclosure may efficiently use available space for tanks to minimize the effect of the tank on luggage capacity. Other examples of the present disclosure may efficiently use available space for tanks to make space available for other purposes.

Figure 8:
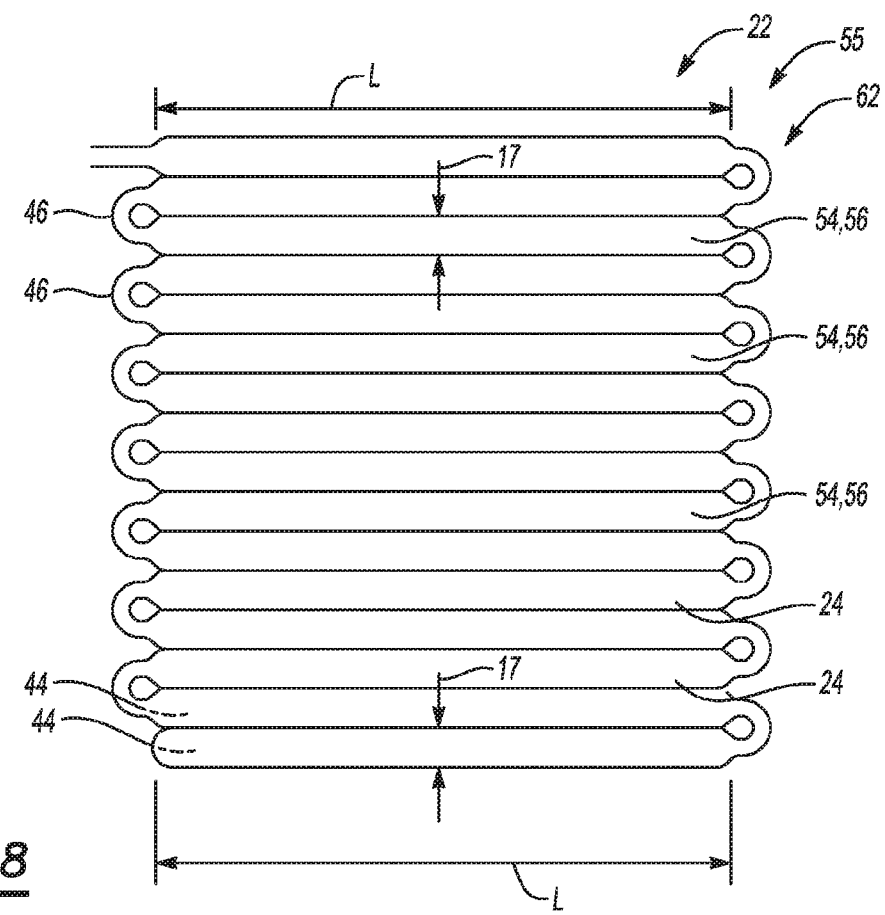
FIG. 8 is a semi-schematic side view of an example of an array of pressure vessels according to the present disclosure.
Figure 9:
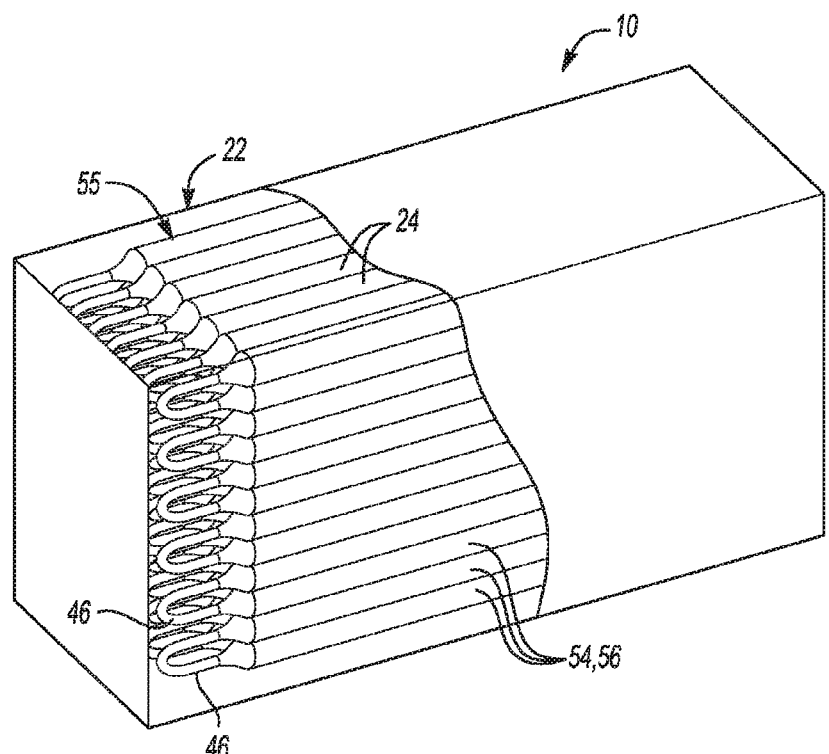
FIG. 9 is a semi-schematic perspective view of an example of a two-dimensional array of pressure vessels in an enclosure with the wall of the enclosure shown partially cut away.

In examples of the present disclosure, a series 62 of serially connected pressure vessels 54 may also be called a segmented conformable pressure vessel 55. Each serially connected pressure vessel 54 may also be called a tank segment 56. FIG. 8 and FIG. 9 are examples of segmented conformable pressure vessels 55. A segmented conformable pressure vessel 55 of the present disclosure may visually resemble a string of sausage links. Connecting tubes 46 connect each tank segment 56 of the segmented conformable pressure vessel 55. The connecting tubes 46 may be flexible, and the tank segments 56 may be placed in a volume for efficient use of the space as illustrated in FIG. 2A, and FIG. 9.

FIG. 8 is a semi-schematic front view of an example of an array 22 of natural gas storage vessels 24 according to the present disclosure. In examples of the present disclosure, an array 22 of natural gas storage vessels 24 for storage of a compressed gas may include at least one Type 4 gas cylinder. However, it is to be understood that the array 22 of the present disclosure must have a plurality (that is, at least 2) of natural gas storage vessels 24. Therefore, a single natural gas storage vessel 24 by itself is not considered an array 22 of natural gas storage vessels 24 according to the present disclosure.

In examples of the present disclosure, the at least one Type 4 gas cylinder may be a plurality of Type 4 gas cylinders in series fluid communication. For example, there may be three Type 4 gas cylinders; 10 Type 4 gas cylinders; 30 Type 4 gas cylinders or any number of Type 4 gas cylinders connected in series.

Figure 10:
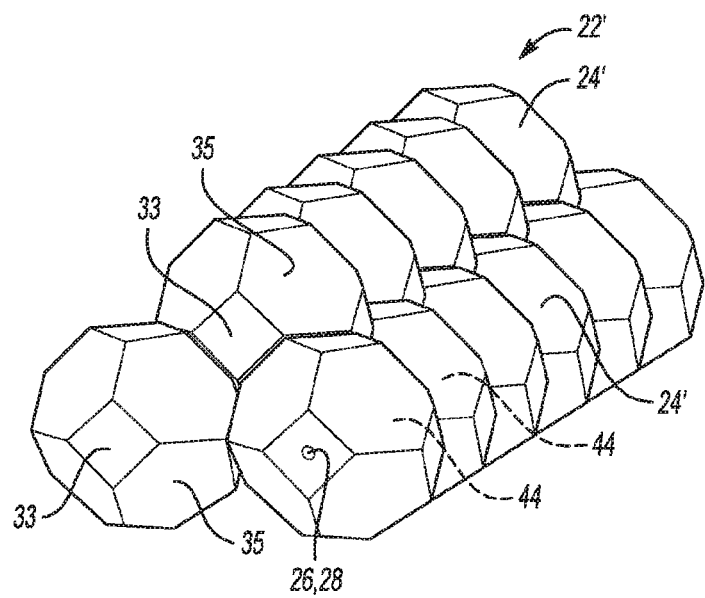
FIG. 10 is a semi-schematic perspective view of an example of an array of truncated octahedron natural gas storage vessels according to another example of the present disclosure.

The natural gas storage vessels of the present disclosure may have any suitable size and shape. FIG. 10 depicts an array 22' of truncated octahedron natural gas storage vessels 24' according to an example of the present disclosure. The array 22' is tessellated into a three dimensional volume defined by the array 22'. Each of the natural gas storage vessels 24' is in fluid communication with adjacent natural gas storage vessels 24' through aligned orifices/apertures (not shown) in adjacent walls of the natural gas storage vessels 24'. Some of the adjacent walls of the natural gas storage vessels 24' are square faces 33 and some of the adjacent walls of the natural gas storage vessels 24' are hexagonal faces 35. There are no apertures in any of the natural gas storage vessels 24' except where there is an adjacent face of a natural gas storage vessels 24' and where there is a single outlet port 26 and a single natural gas fill port 28 for the array 22'. As with the array 22 described above, the array 22' depicted in FIG. 10 may have a common single outlet port 26 and single natural gas fill port 28. Adjacent faces of adjacent natural gas storage vessels 24', in the array 22', are mutually affixed and aligned with bilateral symmetry, and a line through centroids of the adjacent faces is orthogonal to each of the adjacent faces of the adjacent natural gas storage vessels 24'. As such, in the example depicted in FIG. 10, the array 22' is a fluid-tight container.

Figure 11:
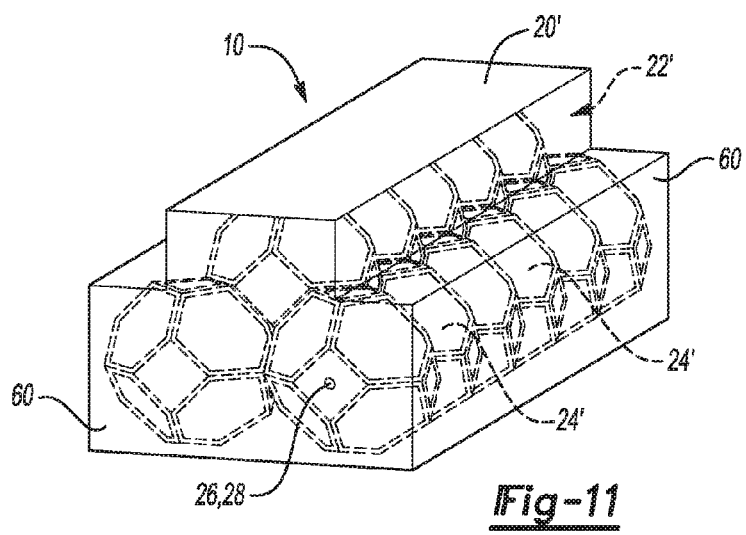
FIG. 11 is a semi-schematic perspective view of an example of a natural gas storage container with the array of truncated octahedron natural gas storage vessels depicted in FIG. 10 shown in an example of an enclosure according to the present disclosure.

FIG. 11 depicts an example of the array 22' of the present disclosure similar to the example depicted in FIG. 10 with an enclosure 20' enveloping the array 22' of truncated octahedron natural gas storage vessels 24' according to an example of the present disclosure. The array 22' is tessellated into a three dimensional volume defined by the enclosure 20'. The enclosure 20' is composed of flat sides 60. Each of the flat sides 60 spans at least two of the natural gas storage vessels 24'. As described above in relation to the example of the array 22' depicted in FIG. 10, the array 22' is a fluid-tight container. In the example depicted in FIG. 11 the array 22' is the primary fluid-tight container, and the enclosure 20' may define a secondary containment vessel. In other examples, the enclosure 20' may not be leak-tight, and the enclosure 20' may be for mechanical support, corrosion protection, visual aesthetic appeal, material handling purposes, or any suitable function.

As used herein, a secondary containment vessel provides redundant containment of the natural gas stored in the array 22, 22', 22" of natural gas storage vessels 24, 24'. The space between the primary (i.e., the natural gas storage vessels 24, 24') and secondary containment vessels may be monitored to detect the presence of natural gas.

The natural gas storage vessels 24, 24' in a natural gas storage container 10 may each have substantially the same shape, and exterior size. As used herein, substantially the same shape and exterior size means the shape and exterior size may vary within manufacturing tolerances. In another example, natural gas storage vessels 24, 24' of several sizes, shapes and weights may be combined to form an array.

Although certain shapes have been described above in association with the Figs., natural gas storage vessels 24, 24' of the present disclosure may have other three dimensional shapes that tessellate a volume. For example, natural gas storage vessels in an array of the present disclosure may include a mixture of irregular dodecahedra with pentagonal faces that possess tetrahedral symmetry. Similarly, natural gas storage vessels may be tetrakaidecahedra with two hexagonal and twelve pentagonal faces possessing antiprismatic symmetry (Weaire-Phelan structures). The tank subunits may be other space filling geometrical shapes including pyritohedra and hexagonal truncated trapezohedra.

It is to be understood that adjacent tank natural gas storage vessels 24' depicted in FIG. 10 and FIG. 11 may be attached to each other by any suitable method. In an example, the natural gas storage vessels 24' are joined together. The natural gas storage vessels 24' may be joined by welding, riveting, or adhesive bonding. In examples, welding may be friction stir welding, resistance welding, metal inert gas (MIG) welding, tungsten inert gas (TIG) welding, or any other welding technique. Adhesive bonding may use acrylics, epoxies, urethanes and/or other adhesives. It is to be understood that any suitable adhesive may be used, e.g., to provide sufficient bonding for the material from which the natural gas storage vessels 24' are formed.

The natural gas storage vessels 24, 24' may be formed from a metal, a polymer, a fiber-reinforced composite, and/or combinations thereof. In some examples, there is at least one Type 4 gas cylinder. Except where otherwise noted, the natural gas storage vessels 24, 24' may be made of any material that is suitable for the rated service pressure. In some examples of the present disclosure, the service pressure may be relatively low. In other examples, the service pressure may be 3,600 psi or higher.

In examples of the present disclosure, a natural gas adsorbent 44 may be positioned within at least one of the natural gas storage vessels 24, 24' (FIG. 8 and FIG. 10). Natural gas storage vessels with natural gas adsorbent 44 inside are called ANG (adsorbed natural gas) containers. Suitable natural gas adsorbents 44 are at least capable of releasably retaining methane compounds (i.e., reversibly storing or adsorbing methane molecules). In some examples, the selected adsorbent 44 may also be capable of reversibly storing other components found in natural gas, such as other hydrocarbons (e.g., ethane, propane, hexane, etc.), hydrogen gas, carbon monoxide, carbon dioxide, nitrogen gas, and/or hydrogen sulfide. In still other examples, the selected adsorbent 44 may be inert to some of the natural gas components and capable of releasably retaining other of the natural gas components.

In general, the adsorbent 44 has a high surface area and is porous. The size of the pores is generally greater than the effective molecular diameter of at least the methane compounds. In an example, the pore size distribution is such that there are pores having an effective molecular diameter of the smallest compounds to be adsorbed and pores having an effective molecular diameter of the largest compounds to be adsorbed. In another example, the adsorbent 44 has a BET surface area greater than about 50 square meters per gram ($m^2/g$) and up to about 5,000 $m^2/g$, and includes a plurality of pores having a pore size greater than about 2 angstroms and up to about 50 nm (nanometers).

Examples of suitable adsorbents 44 include carbon (e.g., activated carbons, super-activated carbon, carbon nanotubes, carbon nanofibers, carbon molecular sieves, zeolite template carbons, etc.), zeolites, metal-organic framework (MOF) materials, porous polymer networks, and combinations thereof. Examples of suitable zeolites include zeolite X, zeolite Y, zeolite LSX, MCM-41 zeolites, silicoaluminophosphates (SAPOs), and combinations thereof. Examples of suitable metal-organic frameworks include MOF-5, ZIF-8, MOF-177, and/or the like, which are constructed by linking inorganic clusters with organic linkers (for example, carboxylate linkers).

The volume that the adsorbent 44 occupies in the natural gas storage vessels 24, 24' will depend upon the density of the adsorbent 44. In an example, it is desirable that the density of the adsorbent 44 range from about 0.1 g/cc (grams per cubic centimeter) to about 0.9 g/cc. A well packed adsorbent 44 may have a density of about 0.5 g/cc. In an example, natural gas storage vessels 24, 24' may include 10 pounds (4,536 g) of a carbon adsorbent 44. At a total adsorption rate of 0.13 g/g of natural gas into carbon, one would expect to have about 1.3 pounds (590 g) of adsorbed natural gas inside the natural gas storage vessels 24, 24'.

Figure 13:
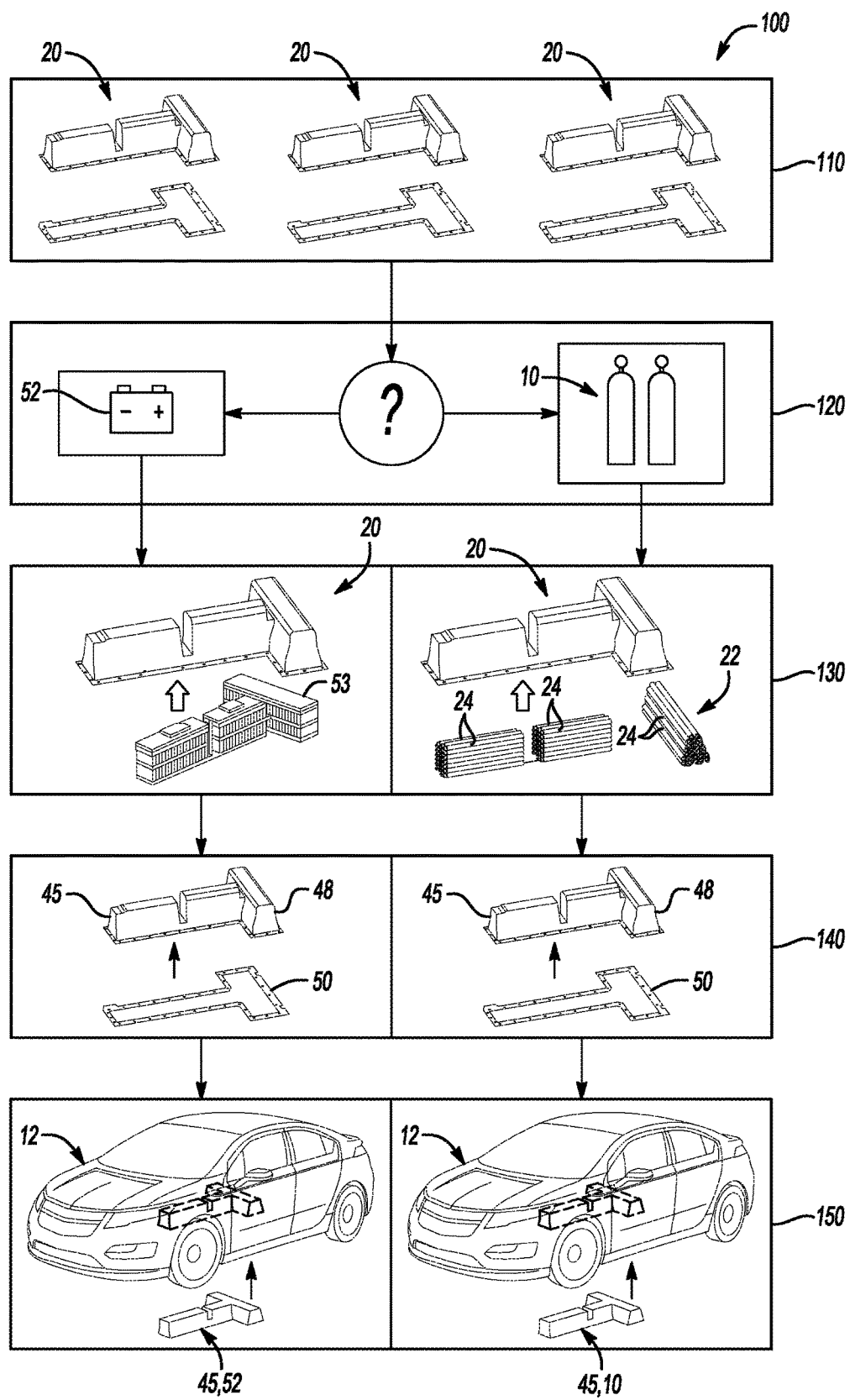
FIG. 13 is a flow-chart depicting an example of a method of manufacturing a plurality of energy storage containers for a fleet of vehicles according to the present disclosure.

FIG. 13 is a flow-chart depicting an example of a method 100 of manufacturing a plurality of energy storage containers 45 for a fleet of vehicles 12 according to the present disclosure. At step 110, the method includes fabricating a plurality of enclosures 20. Each enclosure 20 is for an instance of the energy storage containers 45 and each enclosure 20 is identical to every other enclosure 20 within manufacturing tolerances. At step 120, the method 100 includes determining if an instance of the energy storage container 45 is an electrical energy storage container 52 or natural gas storage container 10. At step 130, the method has 2 potential paths. If the instance of the energy storage container 45 is the electrical energy storage container 52, step 130 includes installing electrical storage batteries 53 (for example lithium ion batteries, Nickel Cadmium batteries, or any other electrical storage battery type) in the enclosure 20 of the instance of the energy storage container 45. Still at step 130, if the instance of the energy storage container 45 is the natural gas storage container 10, step 130 includes installing an array 22 of natural gas storage vessels 24 in the enclosure 20 of the instance of the energy storage container 45.

At step 140, the method 100 includes attaching an enclosure floor 50 on the instance of the energy storage container 45. For example, the enclosure floor 50 may be attached to an enclosure body 48 using threaded fasteners, clamps, or any suitable way of attaching the enclosure floor 50 to the enclosure body.

At step 150, the method 100 includes installing the instance of the energy storage container 45 in a vehicle member of the fleet of vehicles 12. A fleet of vehicles 12 may be a plurality of vehicles. The fleet of vehicles, may, for example, be vehicles 12 manufactured by a particular manufacturer, owned by a particular owner, driven within a particular region, or any other plurality of vehicles.

The method 100 of the present disclosure includes, for example, using the same type of housing for an electrical battery and for conformable natural gas containers. Thus the method reduces design and tooling costs, and allows electric powered and natural gas powered vehicles to share the same platform without changing the occupant or cargo carrying spaces of the vehicles built on the platform. The present disclosure also includes the enclosure 20 being a housing to contain an electrical storage battery 53 in place of the array 22 of natural gas storage vessels 24.

It is to be understood that the ranges provided herein include the stated range and any value or sub-range within the stated range. For example, a range from about 3,000 psi to about 3,600 psi should be interpreted to include not only the explicitly recited limits of about 3000 psi to about 3600 psi, but also to include individual values, such as 3200 psi, 3325 psi, etc., and sub-ranges, such as from about 3450 psi to about 3530 psi; etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Furthermore, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it is to be understood that the disclosed examples may be modified. Therefore, the foregoing description is to be considered non-limiting.

What is claimed is:

1. A vehicle, comprising:
   a vehicle platform defining a T-shaped platform cavity having a fore-aft portion and a transverse portion intersecting the fore-aft portion, wherein the T-shaped platform cavity is open on a road-facing side of the vehicle platform;
   a natural gas fueled engine attached to the vehicle platform, the engine to provide tractive power to at least one drive wheel; and
   an enclosure, attachable to the vehicle platform, to contain an array of natural gas storage vessels, wherein:
      the enclosure is T-shaped to nest in the T-shaped platform cavity of the vehicle platform;
      the array of natural gas storage vessels is disposed completely within the enclosure;
      each natural gas storage vessel of the array of natural gas storage vessels is in fluid communication with a single outlet port for selectively extracting the natural gas from the array of natural gas storage vessels; and
      each natural gas storage vessel of the array of natural gas storage vessels is in fluid communication with a single natural gas fill port.

2. The vehicle as defined in claim 1 wherein the enclosure shields the array of natural gas storage vessels from ultraviolet light.

3. The vehicle as defined in claim 1 wherein the enclosure shields the array of natural gas storage vessels from moisture.

4. The vehicle as defined in claim 1 wherein the enclosure is a housing to contain an electrical battery in place of the array of natural gas storage vessels.

5. The vehicle as defined in claim 1 wherein each natural gas storage vessel in the array of natural gas storage vessels is a cylindrical vessel having an aspect ratio greater than 10.

6. The vehicle as defined in claim 1 wherein:
   each natural gas storage vessel in the array of natural gas storage vessels is a cylindrical vessel having an aspect ratio greater than 10;
   each natural gas storage vessel in the array of natural gas storage vessels has a cylindrical axis;
   the cylindrical axes of the natural gas storage vessels in a fore-aft subset of the array of natural gas storage vessels are parallel to a fore-aft axis of the vehicle; and
   the cylindrical axes of the natural gas storage vessels in a transverse subset of the array of natural gas storage vessels are parallel to a transverse axis of the vehicle and perpendicular to the fore-aft axis of the vehicle.

7. The vehicle as defined in claim 1 wherein each natural gas storage vessel in the array of natural gas storage vessels is a truncated octahedron.

8. The vehicle as defined in claim 1 wherein the array of natural gas storage vessels includes a plurality of Type 4 gas cylinders.

9. The vehicle as defined in claim 1 wherein a natural gas adsorbent is disposed in at least one of the natural gas storage vessels in the array of natural gas storage vessels.

10. The vehicle as defined in claim 1 wherein the enclosure is a secondary containment vessel for natural gas.

11. The vehicle as defined in claim 1 wherein the vehicle platform includes stamped sheet metal and the enclosure includes a conductive material to equalize an electrical potential between the enclosure and the vehicle platform.

12. The vehicle as defined in claim 11 wherein the conductive material is a metallic layer defined on a wall of the enclosure.

13. The vehicle as defined in claim 1 wherein the enclosure includes a fluid cooling circuit.

14. The vehicle as defined in claim 1 wherein:
   the enclosure has an enclosure body;
   the enclosure body defines a T-shaped enclosure body cavity;
   the enclosure has an enclosure floor, removably and sealingly attachable to the enclosure body;
   the enclosure body and the enclosure floor define a fore-aft compartment having a fore-aft subset of the array of natural gas storage vessels disposed therein;
   the enclosure body and the enclosure floor define a transverse compartment having a transverse subset of the array of natural gas storage vessels disposed therein; and
   the fore-aft compartment intersects the transverse compartment.

15. A method of manufacturing a plurality of energy storage containers for a fleet of vehicles, comprising:
   fabricating a plurality of T-shaped enclosures, wherein each enclosure has a fore-aft portion and a transverse portion intersecting the fore-aft portion, each enclosure is for an instance of the energy storage containers and each enclosure is identical to every other enclosure within manufacturing tolerances;
   determining if an instance of the energy storage container is an electrical energy storage container or natural gas storage container;
   if the instance of the energy storage container is the electrical energy storage container, installing electrical storage batteries in the enclosure of the instance of the energy storage container;
   if the instance of the energy storage container is the natural gas storage container, installing an array of natural gas storage vessels in the enclosure of the instance of the energy storage container;
   attaching a floor on the instance of the energy storage container; and
   installing the instance of the energy storage container in a T-shaped platform cavity of a vehicle member of the fleet of vehicles, the T-shaped platform cavity having a fore-aft portion and a transverse portion intersecting the fore-aft portion.

16. A vehicle, comprising:
   a natural gas storage container, including:
      a T-shaped enclosure body having a T-shaped enclosure body cavity, the enclosure body removably and sealingly attached to a T-shaped platform cavity of the vehicle, wherein the T-shaped platform cavity has a fore-aft portion and a transverse portion intersecting the fore-aft portion;

an array of natural gas storage vessels disposed within the enclosure body cavity; and the array of natural gas storage vessels having at least one Type 4 gas cylinder, wherein the enclosure body occludes a substantial amount of ultraviolet light and moisture from coming into contact with the array of natural gas storage vessels.

17. The vehicle as defined in claim 16 wherein the enclosure body is embedded into a chassis of the vehicle.

18. A vehicle, comprising:

a vehicle platform includes stamped sheet metal;

a natural gas fueled engine attached to the vehicle platform, the engine to provide tractive power to at least one drive wheel; and an enclosure, attachable to the vehicle platform, to contain an array of natural gas storage vessels, wherein:

the enclosure includes a conductive material to equalize an electrical potential between the enclosure and the vehicle platform;

the array of natural gas storage vessels is disposed completely within the enclosure;

each natural gas storage vessel of the array of natural gas storage vessels is in fluid communication with a single outlet port for selectively extracting the natural gas from the array of natural gas storage vessels; and each natural gas storage vessel of the array of natural gas storage vessels is in fluid communication with a single natural gas fill port.

19. The vehicle as defined in claim 18 wherein the conductive material is a metallic layer defined on a wall of the enclosure.

20. The vehicle as defined in claim 18 wherein:

the vehicle platform defines a T-shaped platform cavity having a fore-aft portion and a transverse portion intersecting the fore-aft portion;

the T-shaped platform cavity is open on a road-facing side of the vehicle platform;

the enclosure is T-shaped to nest in the T-shaped platform cavity;

each natural gas storage vessel in the array of natural gas storage vessels is a cylindrical vessel having an aspect ratio greater than 10;

each natural gas storage vessel in the array of natural gas storage vessels has a cylindrical axis;

the cylindrical axes of the natural gas storage vessels in a fore-aft subset of the array of natural gas storage vessels are parallel to a fore-aft axis of the vehicle; and the cylindrical axes of the natural gas storage vessels in a transverse subset of the array of natural gas storage vessels are parallel to a transverse axis of the vehicle and perpendicular to the fore-aft axis of the vehicle.

* * * * *